May 3, 1938.  J. R. SCHOENBAUM  2,116,288
PERPETUAL CALENDAR
Filed May 18, 1936    2 Sheets-Sheet 1

Joseph R. Schoenbaum INVENTOR.

May 3, 1938.　　　　J. R. SCHOENBAUM　　　　2,116,288
PERPETUAL CALENDAR
Filed May 18, 1936　　　　2 Sheets-Sheet 2

Joseph R. Schoenbaum INVENTOR.

Patented May 3, 1938

2,116,288

UNITED STATES PATENT OFFICE 2,116,288

PERPETUAL CALENDAR

Joseph R. Schoenbaum, New York, N. Y., assignor of one-half to Philip Glaberman, New York, N. Y.

Application May 18, 1936, Serial No. 80,231

1 Claim. (Cl. 40—115)

My invention relates to certain new and useful improvements and developments in perpetual calendars which aim to provide a simple and effective means of giving the monthly calendar for any month of years past, present and future.

A further object of my invention is to provide a means to obviate any difficulty in locating the monthly calendar in leap years. A further object is to provide a means complete in itself with no extraneous computations whatever and which furthermore requires but two extremely simple operations.

A further object is to provide for the accomplishment of the above, a means so simple that no prior experience in the art is necessary to achieve the required results.

The invention consists chiefly of three disc-like parts of proper relative size and construction as further shown below, connected together and properly marked to be operated as desired.

Figure 1:
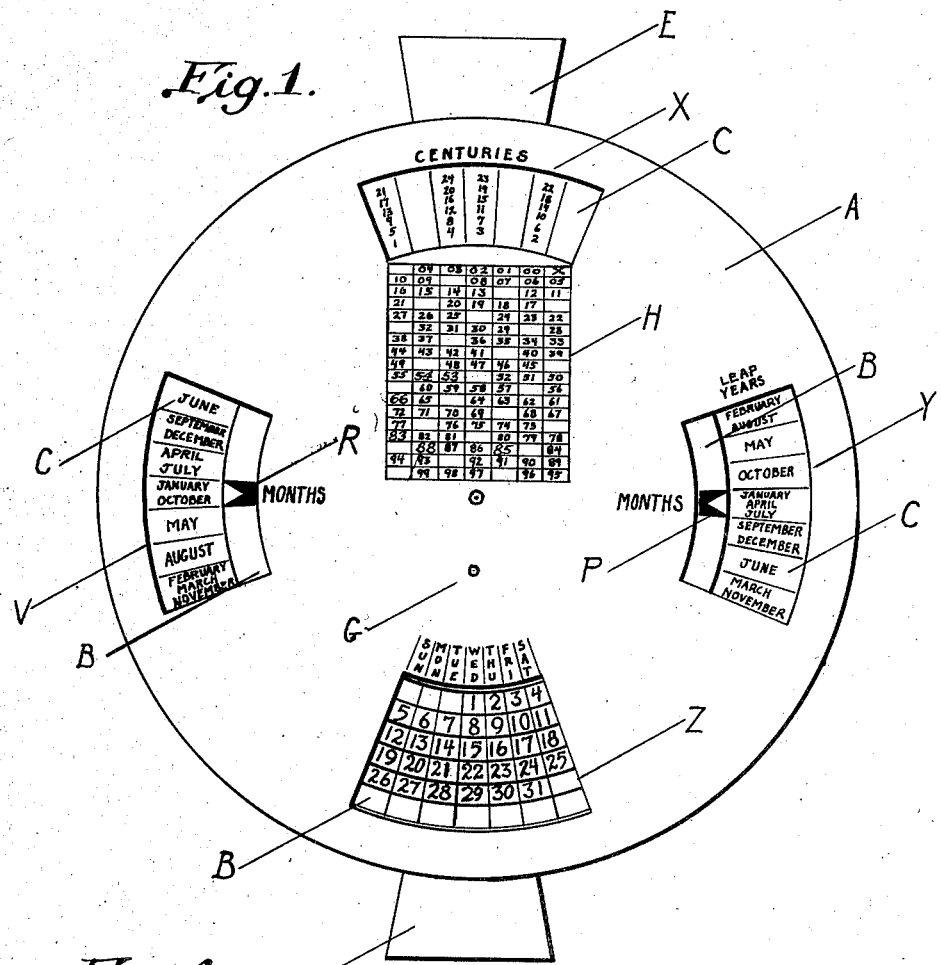
Figure 2:
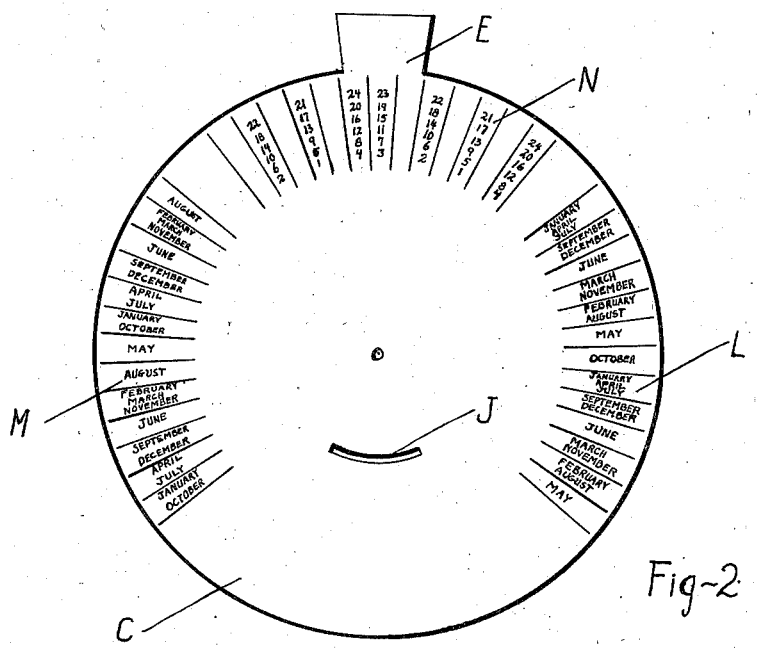

For convenience in operation, certain items are printed in a manner to distinguish their use in leap-years and non leap-years: viz. in "H" (Fig. 1) leap-years are printed in red, non leap-years in black; in Fig. 2 the months "L" are in red, the months "M" are in black.

Figure 4:
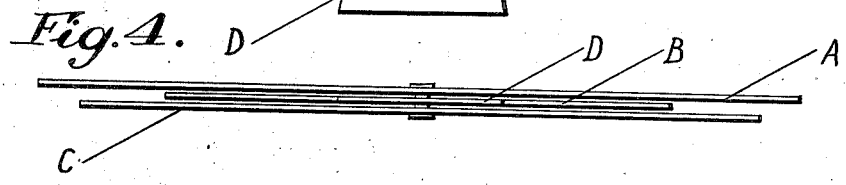
Figure 3:
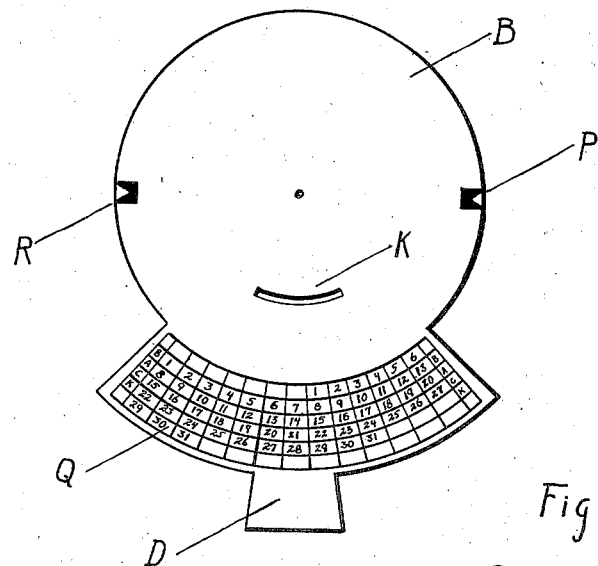

Referring to the drawings which form part of the specification; Fig. 1 represents a full top view of the entire calendar; Fig. 2 represents a plan view of the intermediate disc section; Fig. 3 represents a plan view of the rear disc section; and Fig. 4 is a horizontal edgewise view of the complete assembly. Reference characters are common to all figures.

Fig. 1. Disc "A" has four openings, V, X, Y and Z. "V" is for the months "M" (Fig. 2) for ordinary years. "X" is for the abscissae "N" (Fig. 2) of year numbers. "Y" is for the months "L" (Fig. 2) for leap-years. "Z" is for the numerals "Q" (Fig. 3) of the month's calendar and is headed by the seven days of the week.

"A" also has upon it the seven columns "H" containing the ordinates of the year numbers, leap-years printed in red. The numbers are in sequence from right to left, starting at the top, each leap-year followed by a blank space.

"G" is a stop pin which, passing through the slots "J" and "K" (Figs. 2 and 3) restricts the movement of the discs to their proper limits.

Fig. 2. Disc "C"—"E" is a tab for facility in handling. "M" are the months, printed in black, in proper relation for non leap-years. "N" are the abscissae of year numbers: i. e. the 19 of 1936. "L" are the months, printed in red, in proper relation for leap-years.

Fig. 3. Disc "B"—"D" is a tab for facility in handling. "R" is the pointer for indicating months in non-leap-years; "P" the pointer for leap-years. "Q" is a numerical arrangement, any seven adjoining columns of which will indicate a complete monthly calendar.

The derivations of the various groups are as follows:—Fig. 1, "H". Each year begins one day later than the year preceding, viz. Jan. 1, 1934 is a Monday, Jan. 1, 1935 a Tuesday. Therefore each year ordinate should follow directly the one preceding. In leap-years January and February follow the above rule, but beginning with March, the dates are two days ahead, viz. Mar. 1, 1935 is a Friday, Mar. 1, 1936 a Sunday. Therefore while the leap-year ordinate is in its correct place as concerns January and February, provision is made, in "L" of Fig. 2, to indicate a different position for the months March to December inclusive from those for a non leap-year. Then in order that a correct calendar will be given for the years following leap-years, one space is skipped and the year ordinates continue.

Fig. 2. Every four hundred years the calendar repeats itself implicitly, so that for any column of ordinates of years with an abscissa (for instance) of 13, 17, 21 and etc., the calendar for any particular month will be the same. Due to the fact that exact centuries are not leap-years, the date does not skip a day, viz. Jan. 1, 1899 is a Sunday, and Jan. 1, 1900 is a Monday; Mar. 1, 1899 is a Wednesday and Mar. 1, 1900 a Thursday. Therefore the year abscissae, representing centuries, must skip one space, for if they were adjoining they would indicate a calendar one day too far ahead. In exception, the years divisible by 400 are leap-years, so that the abscissae of these years do adjoin the preceding abscissae.

The months are arranged in two separate groups. In non leap-years January and October begin with the same day, one day later than April and July. These follow September and December by one day, which in turn follow June, etc. as shown in "M" (Fig. 2). In leap-years the arrangement is somewhat different, as in "L" (Fig. 2).

*Operation:*—1. By means of the tab "E" turn disc "C" until the abscissa "N" of the year desired is directly over the ordinate "H" of that year. 2A. In non leap-years (printed in black in "H") move disc "B" by means of tab "D" until the pointer "R" indicates the month "M" (printed in black) desired. The calendar for that month is then shown in "Z". 2B. In leap years (printed in red in "H") turn "B" until the pointer "P" indicates the month "L" (printed also in red) desired. Exact centuries, divisible by 400 are leap years, and the abscissae of these years, 1600, 2000, 2400 etc., should be put not over the 00 in "H" but over the sign —x— printed in red. The range of years may be set as desired by the manufacturer of this device merely by the inclusion in "N" of the abscissae of the years desired.

I claim:—

A perpetual calendar having three circular discs pivoted on a common central axis, the top disc having four equally spaced apertures near its edge, each aperture one-eighth of a circumference in width and approximately one-third of a radius in length, the top aperture being for the purpose of viewing the first numbers of any year, the left aperture for viewing the months for non leap-years, the right aperture for viewing the months for leap-years, and the bottom for viewing the calendar for any month of any indicated year, this top disc also having upon it an arrangement giving in proper sequence the numbers from 00 to 99 any of which may be indicated in use as the last two numbers of any year desired: the second disc having upon it the numerical arrangement which indicates the numbers of the days of any month, and having a tab for ease in manipulation: the third disc having upon it the numerical and monthly arrangements to be viewed in the first three apertures mentioned above, and having a tab for ease in manipulation.

JOSEPH R. SCHOENBAUM.